(12) United States Patent
Lin et al.

(10) Patent No.: US 12,001,026 B2
(45) Date of Patent: Jun. 4, 2024

(54) HEAD-MOUNTED DISPLAY

(71) Applicant: Quanta Computer Inc., Taoyuan (TW)

(72) Inventors: Hung-Yu Lin, Taoyuan (TW); Chun-Feng Yeh, Taoyuan (TW); Jia-Cheng Chang, Taoyuan (TW); Bing-Kai Huang, Taoyuan (TW); Chun-Nan Huang, Taoyuan (TW); Chun-Lung Chen, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 324 days.

(21) Appl. No.: 17/473,354

(22) Filed: Sep. 13, 2021

(65) Prior Publication Data

US 2022/0413304 A1    Dec. 29, 2022

(30) Foreign Application Priority Data

Jun. 29, 2021   (TW) .................................. 110207591

(51) Int. Cl.
*G02B 27/01*      (2006.01)

(52) U.S. Cl.
CPC .. *G02B 27/0176* (2013.01); *G02B 2027/0154* (2013.01); *G02B 2027/0161* (2013.01)

(58) Field of Classification Search
CPC ........ G02B 27/0176; G02B 2027/0154; G02B 2027/0161; Y10T 403/32893; Y10T 403/32901; A42B 3/085

USPC .......................................................... 224/181
See application file for complete search history.

(56) References Cited

U.S. PATENT DOCUMENTS

| 7,000,262 | B2 * | 2/2006 | Bielefeld | A42B 3/145 2/418 |
|---|---|---|---|---|
| 7,484,646 | B1 * | 2/2009 | Holmes | B63C 11/12 362/105 |
| 7,962,972 | B2 * | 6/2011 | Nakabayashi | G02B 27/0176 2/421 |
| 10,724,716 | B2 * | 7/2020 | Neeley | F21V 29/70 |
| 10,871,799 | B2 * | 12/2020 | Yan | G06F 1/163 |
| 2010/0327028 | A1 * | 12/2010 | Nakabayashi | A42B 1/247 224/181 |
| 2017/0205846 | A1 * | 7/2017 | Nagata | G02B 27/0176 |
| 2017/0337737 | A1 * | 11/2017 | Edwards | F16M 13/04 |
| 2019/0339736 | A1 * | 11/2019 | Chang | A42B 3/145 |

* cited by examiner

*Primary Examiner* — Adam J Waggenspack

(57) ABSTRACT

A head-mounted display includes a display device, a connecting structure and a head abutting portion. The connecting structure is in a shape of strip. The connecting structure has two opposite ends. The ends are respectively connected with the display device. The connecting structure and the display device define an accommodation space. The accommodation space is configured to accommodate a head of a user. The head abutting portion is pivotally connected with the connecting structure. The head abutting portion is at least partially located between the connecting structure and the display device. The head abutting portion is configured to abut against the head of the user.

8 Claims, 6 Drawing Sheets

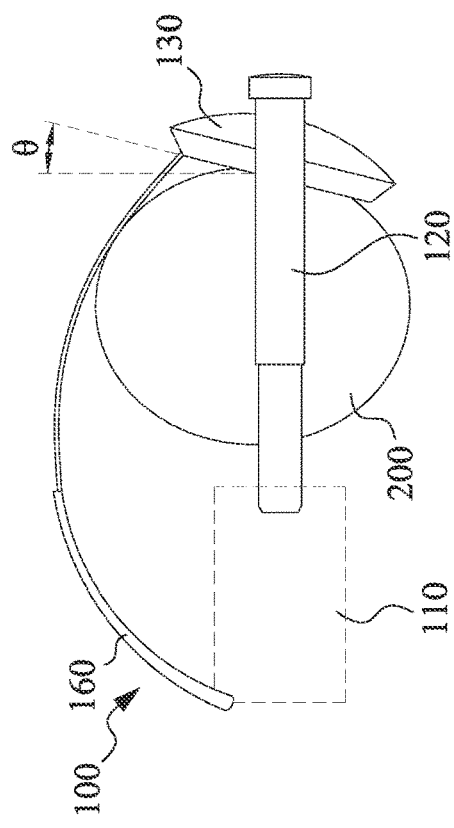
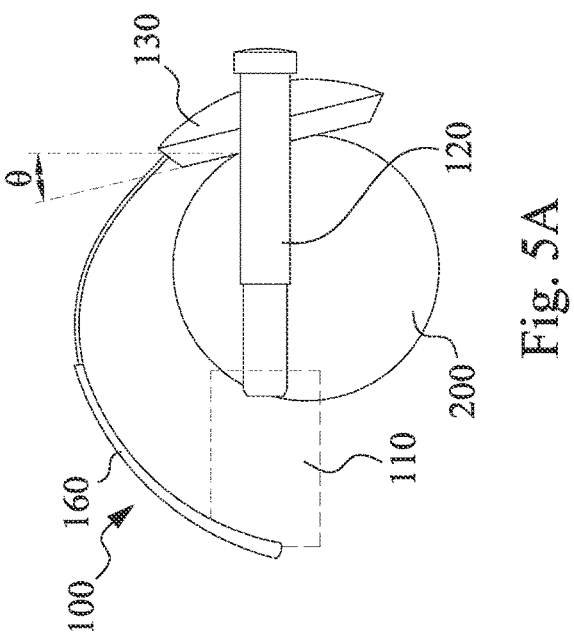
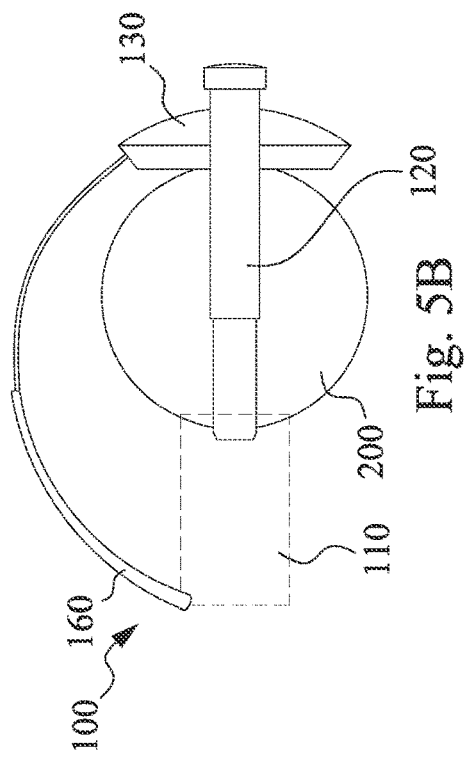

HEAD-MOUNTED DISPLAY

RELATED APPLICATIONS

This application claims priority to Taiwanese Application Serial Number 110207591 filed Jun. 29, 2021, which is herein incorporated by reference.

BACKGROUND

Technical Field

The present disclosure relates to head-mounted displays (HMDs).

Description of Related Art

With the advancement of technology in the society, the technology of virtual reality (VR) is also upgraded everyday. Through wearing a head-mounted display, a virtual environment is fallen into the field of vision of the user. Moreover, the user can interact with the objects in this virtual environment, making the user really feel like being in a three-dimensional virtual world.

In order to allow the user to be better involved in the virtual environment when using the head-mounted display, the way to improve the comfort of wearing the head-mounted display is undoubtedly a direction of development which the industry highly concerns.

SUMMARY

A technical aspect of the present disclosure is to provide a head-mounted display, which can allow the user to enjoy the optimum comfortability when wearing the head-mounted display.

According to an embodiment of the present disclosure, a head-mounted display includes a display device, a connecting structure and a head abutting portion. The connecting structure is in a shape of strip. The connecting structure has two opposite ends. The ends are respectively connected with the display device. The connecting structure and the display device define an accommodation space therebetween. The accommodation space is configured to accommodate a head of a user. The head abutting portion is pivotally connected with the connecting structure. The head abutting portion is at least partially located between the connecting structure and the display device. The head abutting portion is configured to abut against the head of the user.

In one or more embodiments of the present disclosure, the display device, the connecting structure and the head abutting portion are at least partially arranged along an arrangement direction. The head abutting portion is pivotally connected with the connecting structure along an axis. The axis and the arrangement direction are substantially perpendicular with each other.

In one or more embodiments of the present disclosure, the head abutting portion includes a lower casing. The lower casing has two first through holes. The first through holes are opposite to each other. The first through holes respectively extend along the axis. The connecting structure includes two pivoting portions. The lower casing is at least partially located between the pivoting portions. The head-mounted display further includes two rotating rods. The rotating rods respectively penetrate through the corresponding first through hole. The rotating rods are pivotally connected with the corresponding pivoting portion along the axis.

In one or more embodiments of the present disclosure, each of the pivoting portions has a second through hole. The rotating rods respectively insert at least partially into the corresponding second through hole along the axis.

In one or more embodiments of the present disclosure, the head abutting portion further includes a fixing cover. The fixing cover is connected with the lower casing. The fixing cover is at least partially located between the first through holes.

In one or more embodiments of the present disclosure, the head abutting portion further includes a first soft pad. The first soft pad is disposed on the lower casing. The first soft pad is configured to abut against the head of the user. The fixing cover is at least partially located between the lower casing and the first soft pad.

In one or more embodiments of the present disclosure, the first soft pad has an annular shape.

In one or more embodiments of the present disclosure, the head abutting portion is configured to rotate by an angle relative to the connecting structure. A range of the angle is +/−50 degrees.

In one or more embodiments of the present disclosure, the head-mounted display further includes two second soft pads. The second soft pads are respectively disposed on the connecting structure. The second soft pads are opposite to each other. The second soft pads define the accommodation space therebetween. The second soft pads are configured to abut against the head of the user.

In one or more embodiments of the present disclosure, the head-mounted display further includes a connecting belt. The connecting belt has a curved shape. The connecting belt is connected between the display device and the head abutting portion.

When compared with the prior art, the above-mentioned embodiments of the present disclosure have at least the following advantage:

(1) When the user wears the head-mounted display, through the rotation of the head abutting portion relative to the connecting structure by the angle, the head abutting portion is able to abut against the head of the user by the angle with an optimum value in an natural way, such that the user can enjoy the optimum comfortability when wearing the head-mounted display.

(2) Since the first soft pad has an annular shape, the first soft pad can abut against the head of the user in a tighter and a more comfortable manner.

BRIEF DESCRIPTION OF THE DRAWINGS

The disclosure can be more fully understood by reading the following detailed description of the embodiments, with reference made to the accompanying drawings as follows:

FIGS. 5A to 5C are diagrams of application of the head-mounted display of FIG. 1, in which the connecting structure is disposed horizontally relative to a direction along which the head of the user faces to the display device.

DETAILED DESCRIPTION

Figure 1:
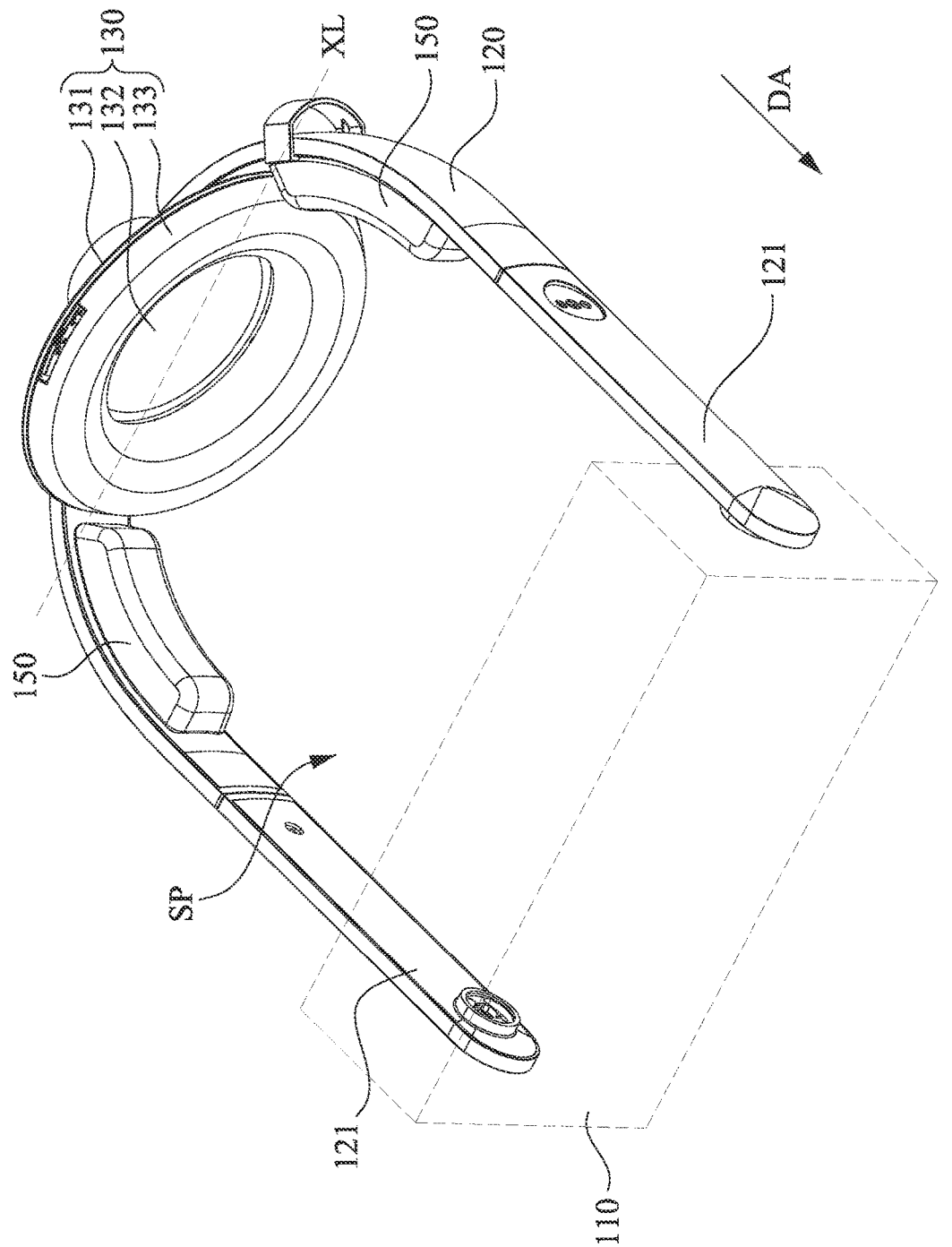
FIG. 1 is a schematic view of a head-mounted display according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
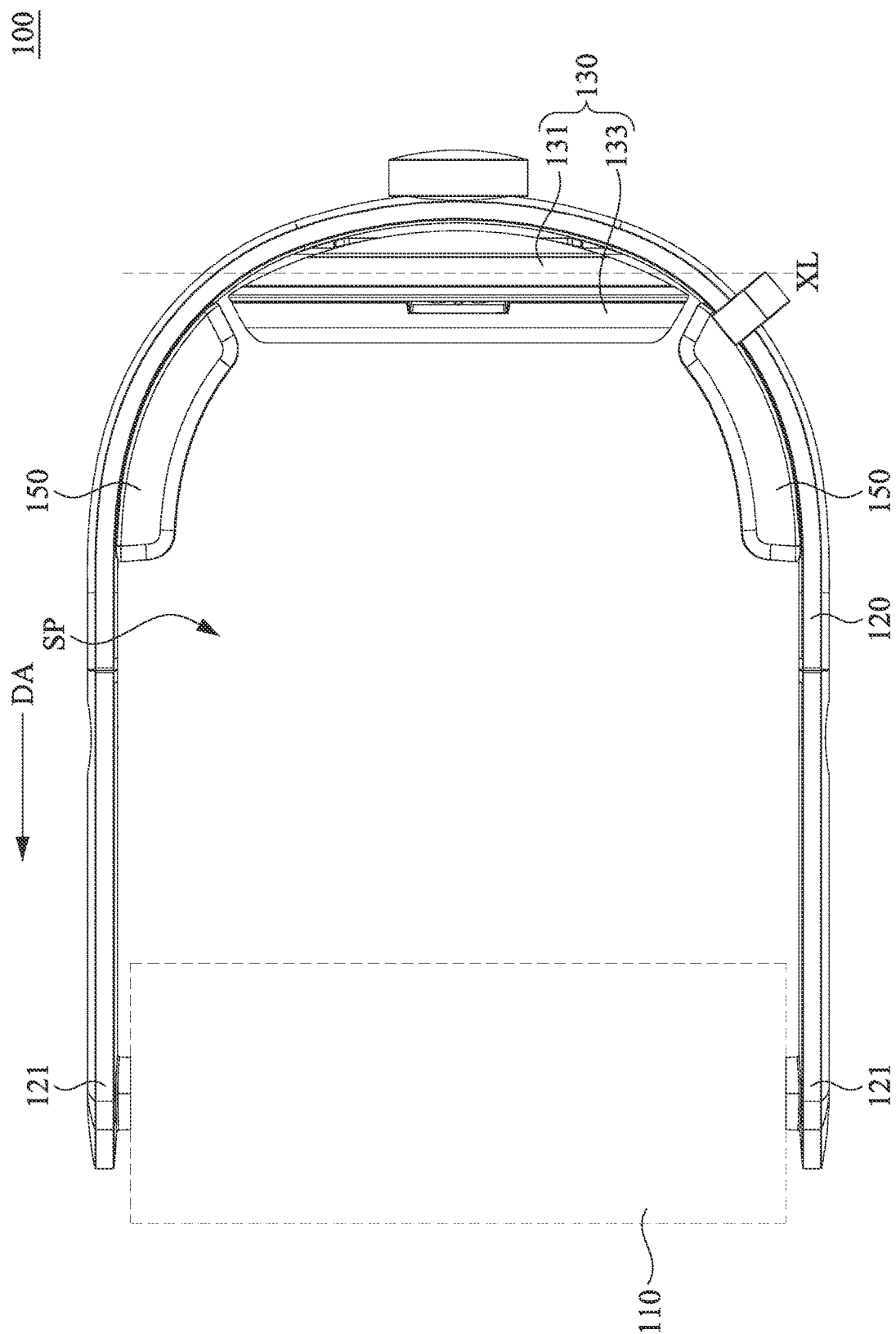
FIG. 2 is a top view of the head-mounted display of FIG. 1.

Reference is made to FIGS. 1-2. FIG. 1 is a schematic view of a head-mounted display 100 according to an embodiment of the present disclosure. FIG. 2 is a top view of the head-mounted display 100 of FIG. 1. In this embodiment, as shown in FIGS. 1-2, a head-mounted display 100 includes a display device 110, a connecting structure 120 and a head abutting portion 130. For the sake of easy understanding of the figures, the display device 110 is drawn by hidden lines. The connecting structure 120 is in a shape of strip. The connecting structure 120 has two opposite ends 121. The ends 121 of the connecting structure 120 are respectively connected with the display device 110. The connecting structure 120 and the display device 110 define an accommodation space SP therebetween. The accommodation space SP is configured to accommodate a head 200 of a user (please see FIGS. 4A-4B, FIGS. 5A-5B and FIGS. 6A-6B for the head 200 of the user). The head abutting portion 130 is pivotally connected with the connecting structure 120. The head abutting portion 130 is at least partially located between the connecting structure 120 and the display device 110. The head abutting head 130 is configured to abut against the head 200 of the user. As the head abutting portion 130 is pivotally connected with the connecting structure 120, the head abutting portion 130 is able to rotate by an angle θ relative to the connecting structure 120 (please see FIGS. 4A-4B, FIGS. 5A-5B and FIGS. 6A-6B for the angle θ). In this way, when the user wears the head-mounted display 100, through the rotation of the head abutting portion 130 relative to the connecting structure 120 by the angle θ, the head abutting portion 130 is able to abut against the head 200 of the user by the angle θ with an optimum value in an natural way, such that the user can enjoy the optimum comfortability when wearing the head-mounted display 100. In practical applications, the display device 110 can be a virtual reality (VR) display device 110 which provides a VR image to the user.

Furthermore, as shown in FIGS. 1-2, the display device 110, the connecting structure 120 and the head abutting portion 130 are at least partially arranged along an arrangement direction DA. The head abutting portion 130 is pivotally connected with the connecting structure 120 along an axis XL. In this embodiment, the axis XL and the arrangement direction DA are substantially perpendicular with each other.

Figure 3:
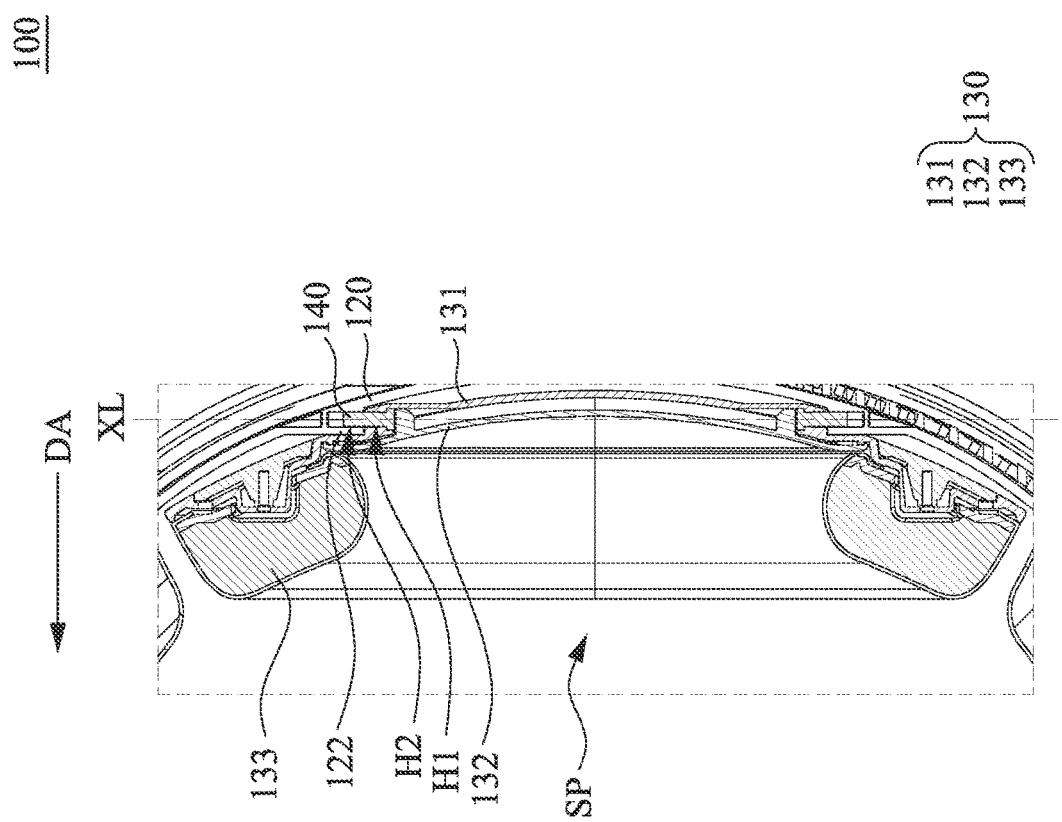
FIG. 3 is a partially enlarged section view of the head-mounted display of FIG. 1.

Reference is made to FIG. 3. FIG. 3 is a partially enlarged section view of the head-mounted display 100 of FIG. 1. To be specific, in this embodiment, as shown in FIG. 3, the head abutting portion 130 includes a lower casing 131. The lower casing 131 has two first through holes H1. The first through holes H1 are opposite to each other. The first through holes H1 of the lower casing 131 respectively extend along the axis XL. This means the first through holes H1 of the lower casing 131 are arranged along the axis XL. The connecting structure 120 includes two pivoting portions 122. The lower casing 131 of the head abutting portion 130 is at least partially located between the pivoting portions 122 of the connecting structure 120. In addition, the head-mounted display 100 further includes two rotating rods 140. The rotating rods 140 respectively penetrate through the corresponding first through hole H1 of the lower casing 131. The rotating rods 140 are pivotally connected with the corresponding pivoting portion 122 of the connecting structure 120 along the axis XL.

In practical application, as shown in FIG. 3, each of the pivoting portions 122 of the connecting structure 120 has a second through hole H2. The second through holes H2 face to each other. The rotating rods 140 respectively insert at least partially into the corresponding second through hole H2 along the axis XL. In other words, the second through holes H2 of the pivoting portions 122 are also arranged along the axis XL. To be specific, as the rotating rods 140 respectively penetrate through the corresponding first through hole H1 of the lower casing 131 along the axis XL, and then insert into the second through hole H2 of the corresponding pivoting portion 122 along the axis XL, the head abutting portion 130 can be rotated relative to the connecting structure 120 about the axis XL.

Moreover, the head abutting portion 130 further includes a fixing cover 132. The fixing cover 132 is connected with the lower casing 131. Moreover, the fixing cover 132 is at least partially located between the first through holes H1 of the lower casing 131. In this way, after the rotating rods 140 respectively at least partially into the corresponding second through hole H2 along the axis XL, the fixing cover 132 blocks the paths along which the rotating rods 140 move away from the second through holes H2. Thus, as the fixing cover 132 is at least partially located between the first through holes H1 of the lower casing 131, the rotating rods 140 cannot detach from the pivoting portions 122 of the connecting structure 120.

To be specific, as shown in FIGS. 1-3, the head abutting portion 130 further includes a first soft pad 133. The first soft pad 133 is disposed on the lower casing 131. The first soft pad 133 is configured to abut against the head 200 of the user. In practical applications, as shown in FIG. 1, the first soft pad 133 has an annular shape, such that the first soft pad 133 can abut against the head 200 of the user in a tighter and a more comfortable manner. The material of the first soft pad 133 can be foam, soft plastic or the like. However, this does not intend to limit the present disclosure. Moreover, as shown in FIGS. 3-4, the fixing cover 132 of the head abutting portion 130 is at least partially located between the lower casing 131 and the first soft pad 133.

In addition, as shown in FIGS. 1-2, the head-mounted display 100 further includes two second soft pads 150. The second soft pads 150 are respectively disposed on the connecting structure 120. The second soft pads 150 are opposite to each other. The second soft pads 150 define the accommodation space SP therebetween. Moreover, the second soft pads 150 are configured to abut against the head 200 of the user. To be more specific, the second soft pads 150 can abut against the two lateral sides of the head 200 of the user, such that the head-mounted display 100 can be firmly worn on the head 200 of the user. For example, the material of the second soft pads 150 can be foam, soft plastic or the like. However, this does not intend to limit the present disclosure.

Figure 4A:
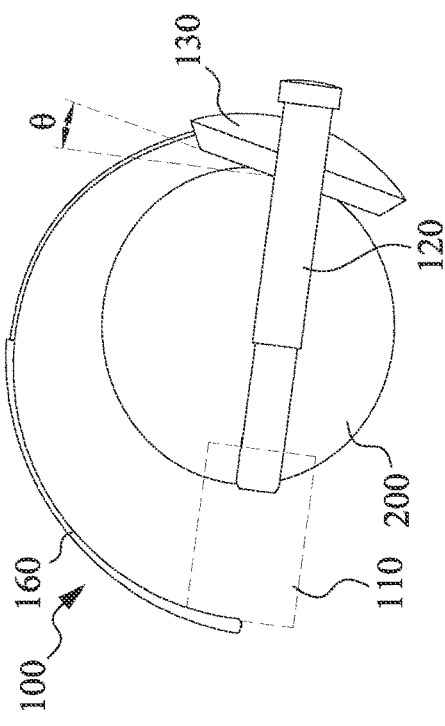
FIGS. 4A to 4C are diagrams of application of the head-mounted display of FIG. 1, in which the connecting structure is inclined upwards relative to a direction along which the head of the user faces to the display device.
Figure 4B:
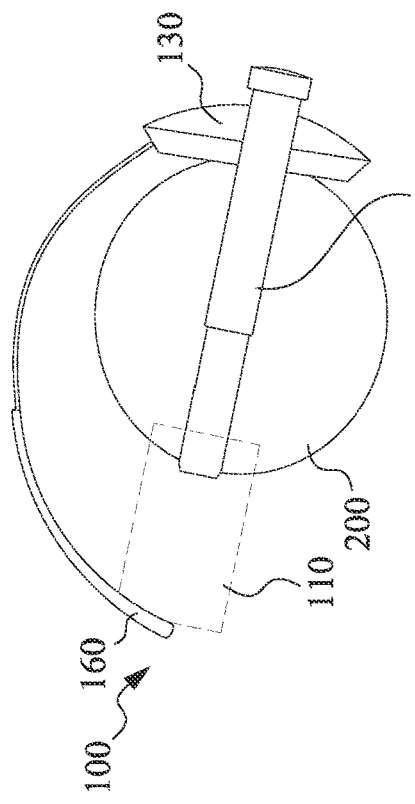
Figure 4C:
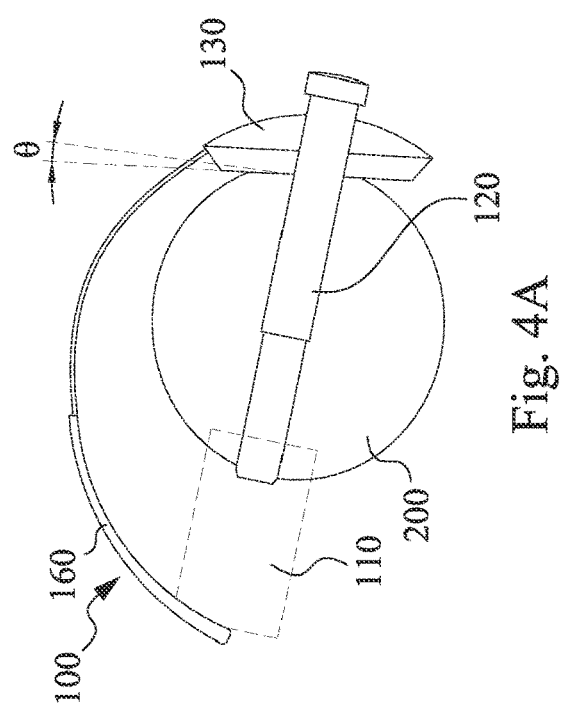

Reference is made to FIGS. 4A-4C. FIGS. 4A to 4C are diagrams of application of the head-mounted display 100 of FIG. 1, in which the connecting structure 120 is inclined upwards relative to a direction along which the head 200 of the user faces to the display device 110. As mentioned above, the head abutting portion 130 is configured to rotate by an angle θ relative to the connecting structure 120. In practical applications, a range of the angle θ is +/−50 degrees. However, this does not intend to limit the present disclosure. According to the wearing condition of the user, as shown in FIGS. 4A-4C, the connecting structure 120 is inclined upwards relative to the direction along which the head 200 of the user face to the display device 110, and the head abutting portion 130 rotates relative to the connecting structure 120 by the angle θ. For example, the angle θ is about −20 degrees (please see FIG. 4A), the angle θ is about 0 degree (please see FIG. 4B, only the status of the head abutting portion 130 relative to the connecting structure 120 is shown but the angle θ is not marked in FIG. 4B since the angle θ is about 0 degree), or the angle θ is about +50 degrees (please see FIG. 4C), such that the user can enjoy the optimum comfortability when wearing the head-mounted display 100.

Furthermore, as shown in FIGS. 4A-4C, the head-mounted display 100 further includes a connecting belt 160. The connecting belt 160 has a curved shape. The connecting belt 160 is connected between the display device 110 and the head abutting portion 130, so as to increase the structural strength of the head-mounted display 100. For the sake of drawing simplification, the connecting belt 160 is not shown in FIGS. 1-2.

Reference is made to FIGS. 5A-5C. FIGS. 5A to 5C are diagrams of application of the head-mounted display 100 of FIG. 1, in which the connecting structure 120 is disposed horizontally relative to a direction along which the head 200 of the user faces to the display device 110. According to the wearing condition of the user, as shown in FIGS. 5A-5C, the connecting structure 120 is disposed horizontally relative to the direction along which the head 200 of the user face to the display device 110, and the head abutting portion 130 rotates relative to the connecting structure 120 by the angle θ. For example, the angle θ is about −30 degrees (please see FIG. 5A), the angle θ is about 0 degree (please see FIG. 5B, only the status of the head abutting portion 130 relative to the connecting structure 120 is shown but the angle θ is not marked in FIG. 5B since the angle θ is about 0 degree), or the angle θ is about +30 degrees (please see FIG. 5C), such that the user can enjoy the optimum comfortability when wearing the head-mounted display 100.

Figure 6A:
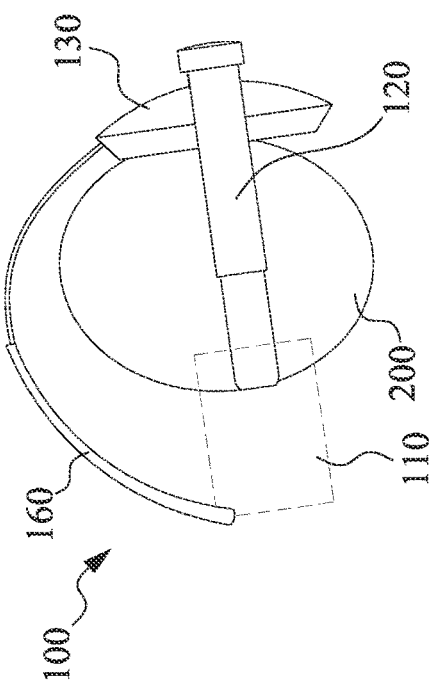
FIGS. 6A to 6C are diagrams of application of the head-mounted display of FIG. 1, in which the connecting structure is inclined downwards relative to a direction along which the head of the user faces to the display device.
Figure 6B:
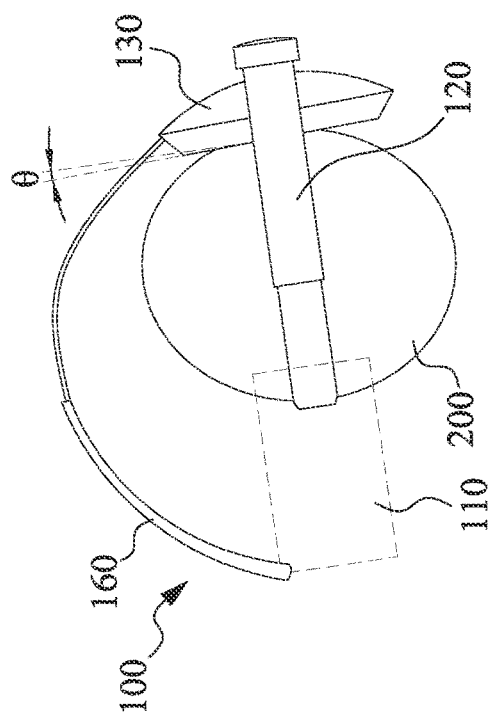
Figure 6C:
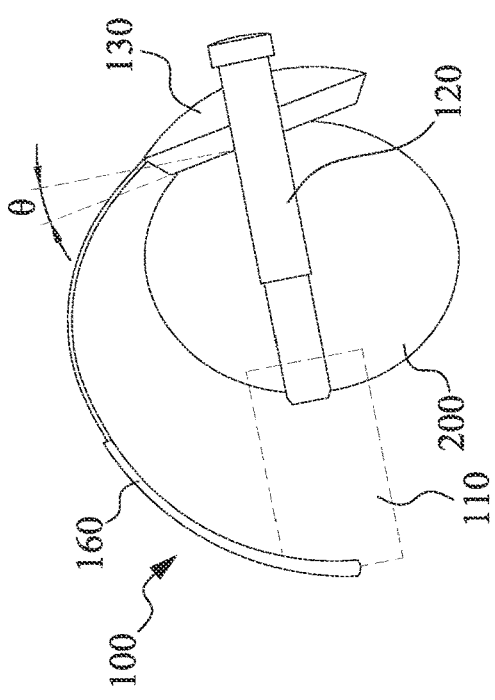

Reference is made to FIGS. 6A-6C. FIGS. 6A to 6C are diagrams of application of the head-mounted display 100 of FIG. 1, in which the connecting structure 120 is inclined downwards relative to a direction along which the head 200 of the user faces to the display device 110. According to the wearing condition of the user, as shown in FIGS. 6A-6C, the connecting structure 120 is inclined downwards relative to the direction along which the head 200 of the user face to the display device 110, and the head abutting portion 130 rotates relative to the connecting structure 120 by the angle θ. For example, the angle θ is about −50 degrees (please see FIG. 6A), the angle θ is about −20 degrees (please see FIG. 6B), or the angle θ is about 0 degree (please see FIG. 6C, only the status of the head abutting portion 130 relative to the connecting structure 120 is shown but the angle θ is not marked in FIG. 6B since the angle θ is about 0 degree), such that the user can enjoy the optimum comfortability when wearing the head-mounted display 100.

In conclusion, when compared with the prior art, the aforementioned embodiments of the present disclosure have at least the following advantage:

(1) When the user wears the head-mounted display, through the rotation of the head abutting portion relative to the connecting structure by the angle, the head abutting portion is able to abut against the head of the user by the angle with an optimum value in an natural way, such that the user can enjoy the optimum comfortability when wearing the head-mounted display.

(2) Since the first soft pad has an annular shape, the first soft pad can abut against the head of the user in a tighter and a more comfortable manner.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A head-mounted display, comprising:
   a display device;
   a connecting structure in a shape of strip and having two opposite ends, the ends being respectively connected with the display device, the connecting structure and the display device defining an accommodation space, the accommodation space being configured to accommodate a head of a user, the connecting structure comprising two pivoting portions;
   a head abutting portion pivotally connected with the connecting structure along an axis and at least partially located between the connecting structure and the display device, the head abutting portion being configured to abut against the head of the user, the display device, the connecting structure and the head abutting portion being at least partially arranged along an arrangement direction, the axis and the arrangement direction being substantially perpendicular with each other, the head abutting portion comprising a lower casing, the lower casing having two first through holes opposite to each other, the first through holes respectively extending along the axis, the lower casing being at least partially located between the pivoting portions; and
   two rotating rods respectively penetrating through the corresponding one of the first through holes and being pivotally connected with the corresponding one of the pivoting portions along the axis.

2. The head-mounted display of claim 1, wherein each of the pivoting portions has a second through hole, the rotating rods respectively insert at least partially into the corresponding second through hole along the axis.

3. The head-mounted display of claim 1, wherein the head abutting portion further comprises a fixing cover, the fixing cover is connected with the lower casing and is at least partially located between the first through holes.

4. The head-mounted display of claim 3, wherein the head abutting portion further comprises a first soft pad, the first soft pad is disposed on the lower casing and is configured to abut against the head of the user, the fixing cover is at least partially located between the lower casing and the first soft pad.

5. The head-mounted display of claim 4, wherein the first soft pad has an annular shape.

6. The head-mounted display of claim 1, wherein the head abutting portion is configured to rotate by an angle relative to the connecting structure, a range of the angle is +/−50 degrees.

7. The head-mounted display of claim 1, further comprising:
 two second soft pads respectively disposed on the connecting structure and being opposite to each other, the second soft pads defining the accommodation space therebetween and being configured to abut against the head of the user.

8. The head-mounted display of claim 1, further comprising:
 a connecting belt having a curved shape and connected between the display device and the head abutting portion.

* * * * *